Jan. 29, 1924.
E. F. JONES
PISTON
Filed April 13, 1922
1,481,909
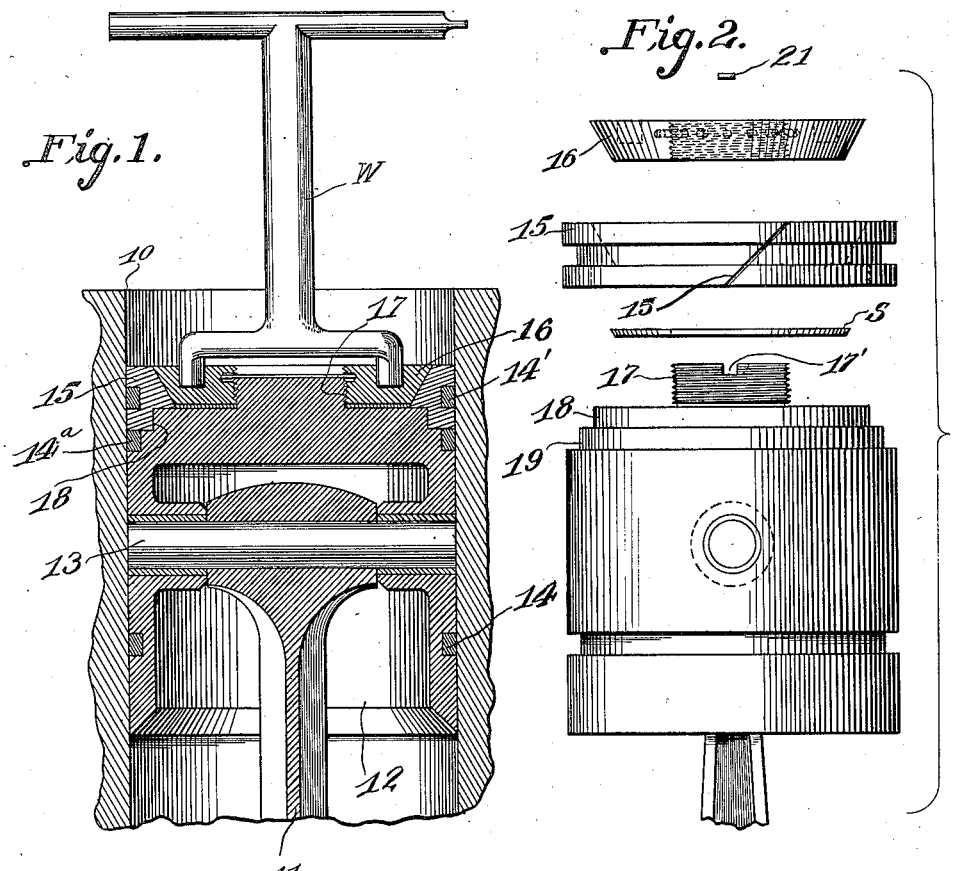
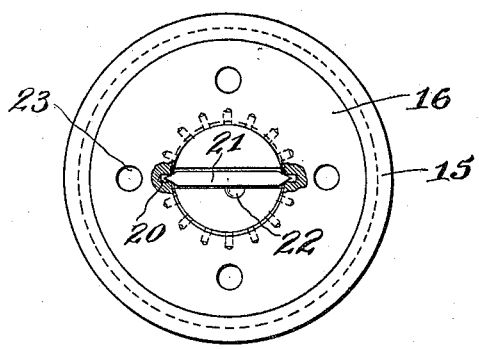
Inventor
Ellis F. Jones.
By Mason, Fenwick & Lawrence
Attorneys Patented Jan. 29, 1924.

1,481,909

UNITED STATES PATENT OFFICE.

ELLIS F. JONES, OF BURLINGTON, IOWA.

PISTON.

Application filed April 13, 1922. Serial No. 552,118.

*To all whom it may concern:*

Be it known that I, ELLIS F. JONES, a citizen of the United States, residing at Burlington, in the county of Des Moines and State of Iowa, have invented certain new and useful Improvements in Pistons; and I do hereby declare the following to be a full, clear, and exact description of the invention, such as will enable others skilled in the art to which it appertains to make and use the same.

This invention relates to improvements in gas engines and more particularly to the piston thereof, it being an object of the invention to provide a piston which may be adjusted to fit the cylinder to take up the play between the latter and the piston due to wear. The invention aims to provide a device of the character specified that shall be accessible without removing the piston from the cylinder and which shall be simple in construction and not liable to get out of order.

The invention consists primarily of an expandible ring mounted on the head of the piston and means for expanding the ring comprising complementary bevelled surfaces between an adjusting nut and the expandible ring, the ring being not self-expanding, but depending for expansion on the adjusting means. The ring is preferably provided with a circumferential groove to receive a suitable piston packing ring.

The above and other novel features of construction will appear from the detailed description and the accompanying drawing forming part of this specification.

In the drawings,

Figure 1 is a longitudinal section taken through the piston showing the preferred form of the invention;

Fig. 2 is a view in side elevation showing the parts in disassembled relation, and Fig. 3 is a plan view of the piston showing my invention applied thereto.

In the drawings, 10 designates any conventional gas engine cylinder, 11 the connecting rod, 12 the piston, 13 the wrist pin, and 14 the piston packing rings, the above construction being more or less conventional.

15 indicates the expandible ring forming part of this invention and 16 a disk-like nut which is adapted to be threaded onto a pillar 17 which extends from the head of the piston. The nut is circumferentially bevelled to conform to the interior bevelled periphery of the ring 15. The head of the piston is preferably stepped as at 18 to form a seat for an annular flange which extends axially of the ring and the ring is provided with a circumferential groove to receive a packing ring 14'. The piston may also be stepped as at 19 to form with the face of the annular flange, a groove for another piston ring 14ª.

In order to provide for nicety of adjustment of the expandible ring with respect to the cylinder, I place a laminated washer-shim $s$ between the nut and head of the piston.

In order to lock the nut to the piston, I prefer to provide the threaded interior of the nut with a series of radial holes 20 which are adapted to receive the pointed ends of a flat piece of spring steel 21, the threaded pillar being slotted as at 17' to receive said piece 21. In order to permit ready removal of the spring piece from locking position, the pillar 17 is provided with a notch 22 opening onto the slot 17', the notch permitting a screw driver or other tool to be inserted below the strip 21 to flex the same and thus remove the pointed ends thereof from the nut as will be readily understood.

The top of the nut 16 is provided with a plurality of holes 23 which are adapted to receive the prongs of a spanner wrench W as shown in Fig. 1. The slot 17' in the cylinder 17 is made sufficiently deep to insure that the spring piece 21 shall lie well down therein to enable the tang of a wrench to be placed therein to hold the piston from turning during the process of turning the nut on the pillar 17.

The above described invention, while simple, is of great practical utility. In order to take up the play of the piston in its cylinder, it is not necessary to remove the piston from the cylinder inasmuch as the adjusting nut is accessible from the top of the piston. The invention is particularly designed for use in connection with tractors where the gas engine is submitted to severe usage and time cannot be taken during the busy season to re-condition the engine by the supplying of new parts.

The ring 15 may be split in any suitable manner as by a diagonal cut 15' and it is not contemplated that the ring shall be self-expanding as is the case with piston packing rings.

What I claim is:

1. The combination with a piston, a plurality of annular steps formed at the outer end of said piston, an expandible ring mounted on said piston and seated on said annular steps, a threaded pillar formed on said piston extending axially thereof, a nut threaded on said pillar and having a bevelled periphery, said ring having an interior bevelled periphery complementary to the bevel of the nut.

2. The combination with a piston, a plurality of annular steps formed at the outer end of said piston, an expandible ring mounted on said piston and seated on said annular steps, a threaded pillar formed on said piston extending axially thereof, a nut threaded on said pillar and having a bevelled periphery, said ring having an interior bevelled periphery complementary to the bevel of the nut, and means for locking the said nut on said pillar.

In testimony whereof I affix my signature.

ELLIS F. JONES.